United States Patent [19]

Tuson et al.

[11] 4,348,137

[45] Sep. 7, 1982

[54] PIVOTAL CONNECTION FOR ARTICULATED COLUMN OF SEA-BED WORKING STRUCTURE

[75] Inventors: Samuel Tuson, Mesnil-Le-Roi; Jean-Pierre Ghilardi, La Bouffemont, both of France

[73] Assignee: Entreprise d'Equipements Mecaniques et Hydrauliques EMH, France

[21] Appl. No.: 931,421

[22] Filed: Aug. 7, 1978

[30] Foreign Application Priority Data

Aug. 12, 1977 [FR] France .............................. 77 24912

[51] Int. Cl.³ .............................................. E02B 17/00
[52] U.S. Cl. .................................. 405/202; 285/163
[58] Field of Search ................. 285/163, 223; 405/202

[56] References Cited

U.S. PATENT DOCUMENTS

| 4,010,500 | 3/1977 | Reid, Jr. | 9/8 P |
| 4,026,119 | 5/1977 | Dotti | 405/202 |
| 4,142,820 | 3/1979 | Tuson | 405/202 |
| 4,158,517 | 6/1979 | Foglia | 405/202 |
| 4,268,191 | 5/1981 | Tuson | 405/202 |

Primary Examiner—Thomas F. Callaghan
Attorney, Agent, or Firm—Steinberg & Raskin

[57] ABSTRACT

The invention relates to a pivotal connecting device of the kind forming a universal Cardan joint coupling in particular for a compliant or articulated column of a sea-bed working structure, said column being pivotally connected to a base member, wherein said universal Cardan joint coupling is associated with one or more rigid connecting ducts for conveying the flow of at least one fluid between said base member and said column.

5 Claims, 5 Drawing Figures

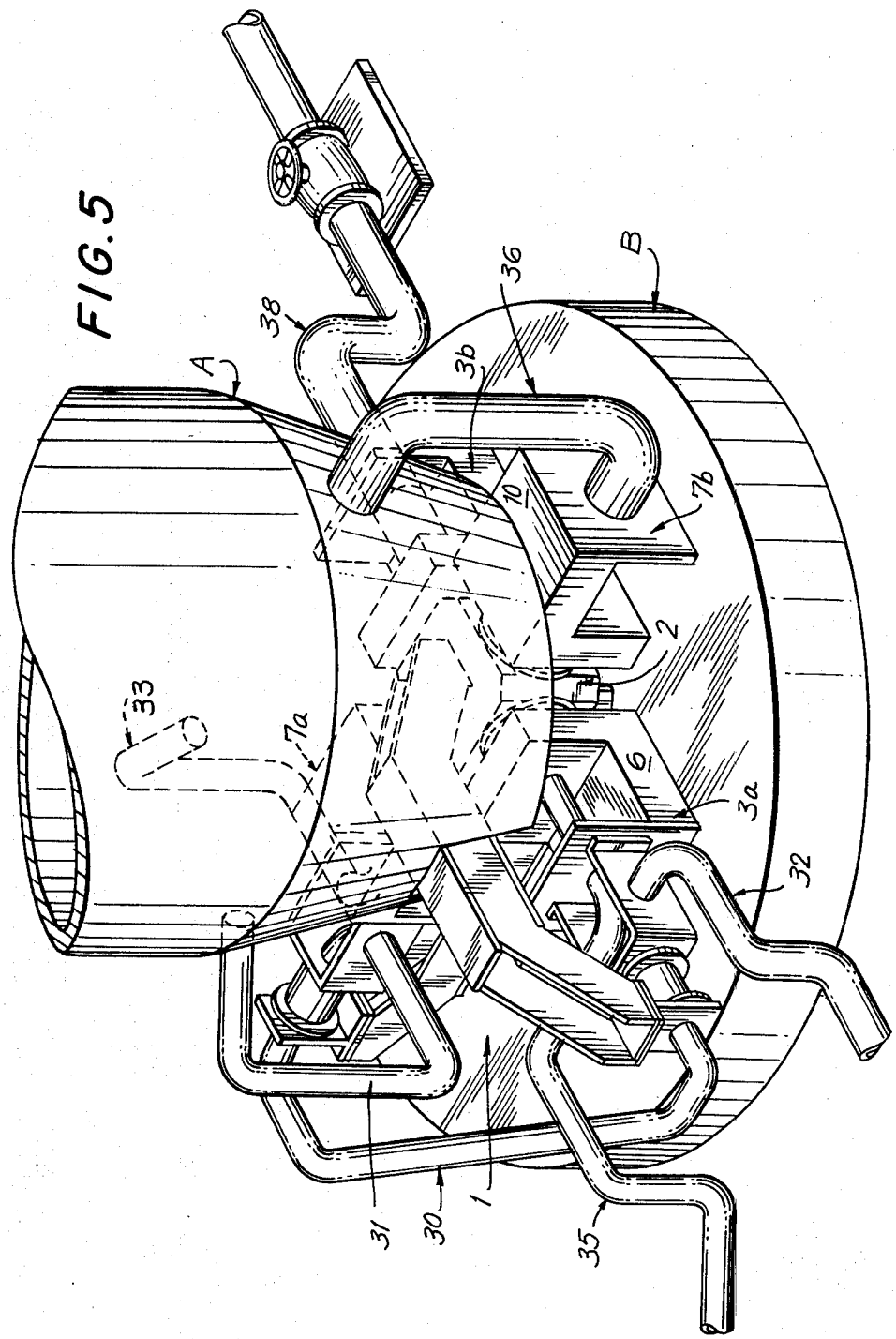

PIVOTAL CONNECTION FOR ARTICULATED COLUMN OF SEA-BED WORKING STRUCTURE

The invention relates generally to a pivotal connection or like articulating link means or unit of the kind forming a so-called Cardan or Hooke's or like universal joint coupling and is more particularly directed to a pivotal connection or like articulating link unit enabling one or advantageously more fluid conveying rigid flow pipe-lines or ducts in particular for a sea-bed working structure or like sea-floor exploiting construction, to extend between a base member resting on the sea-bottom and a so-called complaint or articulated emergent column, platform or tower pivotally connected onto said base member.

One of the problems set by the sea-bed working constructions is encountered at the design stage of the structure of various fluid carrying flow ducts or pipelines to be installed which design would vary in particular in accordance with the location of the site to be worked, the type of working structure or construction and so on.

In the case of working structures comprising at least one generally emergent complaint or articulated column pivotally connected to a base member by means of a Cardan or Hooke's or like universal joint coupling mounted for rotation or swinging motion about two axes of rotation, respectively, extending at right angles to each other and carried by the column and the base member, respectively, the lay-out or set-up and the structural arrangement of the connecting ducts between the base member and the column for the flow of a fluid are presently carried out according to two concepts or approaches.

The first concept consists in providing between the base member and the column (which owing to its articulating link or pivotal connection on the stationary base member is adapted to oscillate according to the atmospheric conditions prevailing at the sea-level) flexible or yielding junction ducts at the passage-way past the pivotal connection without any connection to the latter.

The second concept or approach consists in providing between the base member and the column, rigid connecting ducts associated with four ring-shaped or annular torsion couplings axially aligned by pairs in registering relationship along the aforesaid axes of rotation, which couplings enable a fluid to flow between the column and the base member. More specifically, one of the two couplings associated with the base member is connected through a bent rigid junction duct to one of the couplings associated with the column whereas the other coupling of the base member is connected through a rigid bent junction duct to the other coupling associated with the column. These two rigid bent junction or connecting ducts extend through the inside of the Cardan joint spider which generally has a parallelepipedic hollow shape.

While the first approach does not set a limitation upon the number of connections likely to be established between the column and the base member, a system according to the second approach is limited to two connections since there should be provided passage-ways through the four torsion couplings of the pivotal connection, connected by pairs i.e. two by two.

A main object of the invention is to overcome such a limitation and to provide on the one hand a passage-way for several rigid connecting ducts with annular torsion couplings fitted therebetween, between the column and the base member, and on the other hand for the passage-way of at least one rigid connecting duct extending outside of the spider or like central part of the Cardan joint.

For this purpose, the invention provides a pivotal connection or articulating link device of the kind forming a so-called universal or Cardan or Hooke's joint coupling in particular for a complaint or articulated column of a sea-bed working construction, said column being pivotally connected to a base member resting on the sea-floor or bottom so as to be able to swing about two perpendicular axes of rotation, respectively, bound to or supported by said column and said base member, respectively, said pivotal connection being characterized in that said joint coupling is associated or combined with one or more rigid connecting ducts adapted to convey the flow of a fluid between said base member and said column. As known per se, said joint coupling consists of a hollow spider of substantially parallelepipedic shape pivotally connected on the one hand to a pair of clevis-like supports or bearing brackets mounted on either side of two opposite side or end faces, respectively, of said spider for swinging motion about a first axis of rotation, said brackets being fast with the base member thereby forming the two prongs of one fork of the Cardan joint coupling rigidly connected to the base member, and on the other hand to a pair of clevis-like supports or bearing brackets mounted on either side of the two other opposite side end faces, respectively, of said spider for swinging motion about a second axis of rotation extending at right angles to the first axis of rotation, said last-named pair of brackts being fast with the immerged lower end of the column thereby forming the two prongs of the other fork holding the Cardan joint coupling and rigidly connected to said column. According to a further characterized feature of the invention, said joint or coupling also comprises a pair of bridge portions extending along said two axes of rotation, respectively, and made fast by one end thereof with the top and bottom faces, respectively, of said spider, and by the other end thereof with the ends of a pair of torsion couplings aligned in substantially registering relationship with said axes of rotation, respectively, whereas the other ends of said torsion couplings are supported by two yokes, respectively, made fast with the two adjacent brackets.

As known per se, each aforesaid bracket supports a torsion coupling, the torsion coupling of one bracket, arranged along one aforesaid axis of rotation, being connected with one end thereof to a duct made fast with the base member and with the other end thereof to one end of the torsion coupling of one bracket arranged along the second axis of rotation through the agency of a rigid connecting duct, said torsion coupling being connected with its other end to a rigid duct made fast with the column, the other torsion coupling of the bracket, arranged along the first axis of rotation, being likewise connected to the other torsion coupling of the bracket arranged along the second axis of rotation, these torsion couplings being connected to a rigid duct made fast with the base member and to a rigid duct made fast with the column. According to another characterizing feature of the invention, a third connection between the column and the base member is provided through the agency of a rigid connecting duct mounted between said torsion couplings arranged along both axes of rotation, respectively, and made fast with said two yokes, respectively, these torsion couplings being themselves connected to a rigid duct made fast with the base member and to a rigid duct made fast with the column, respectively.

According to still another characterizing feature of the invention, said three fluid flow connections between the column and the base member all extend through the spider of the pivotal connection or universal joint coupling.

According to a further characterizing feature of the invention, the pivotal connection enables one and advantageously several connecting ducts to extend between the column and the base member, all of these connecting ducts extending outside the spider of the pivotal connection forming the universal or Cardan joint coupling.

The pivotal connection or Cardan joint coupling according to the invention offers in particular the advantage that in the case where the rigid connecting ducts extend outside the spider of said pivotal connection or universal joint coupling, it is possible to substantially reduce the size of the latter because no connecting duct or the like pipe-line is extending therethrough.

According to another characterizing feature of the invention, all of the rigid ducts between the column and the base member are of continuous or uniform cylindrical cross-section and are formed with sufficiently wide bends to enable a pig tool or like scraper or scratcher implement to pass or be run therethrough.

The invention will be better understood and further objects, characterizing features, details and advantages thereof will appear more clearly as the following explanatory description proceeds with reference to the accompanying diagrammatic drawings given by way of non limiting examples only illustrating several presently preferred specific embodiments of the invention and wherein:

FIG. 5 is a partial perspective view showing the pivotal connection or universal joint coupling according to the embodiment illustrated in FIG. 1 in conjunction with a column and base member.

Figure 1:
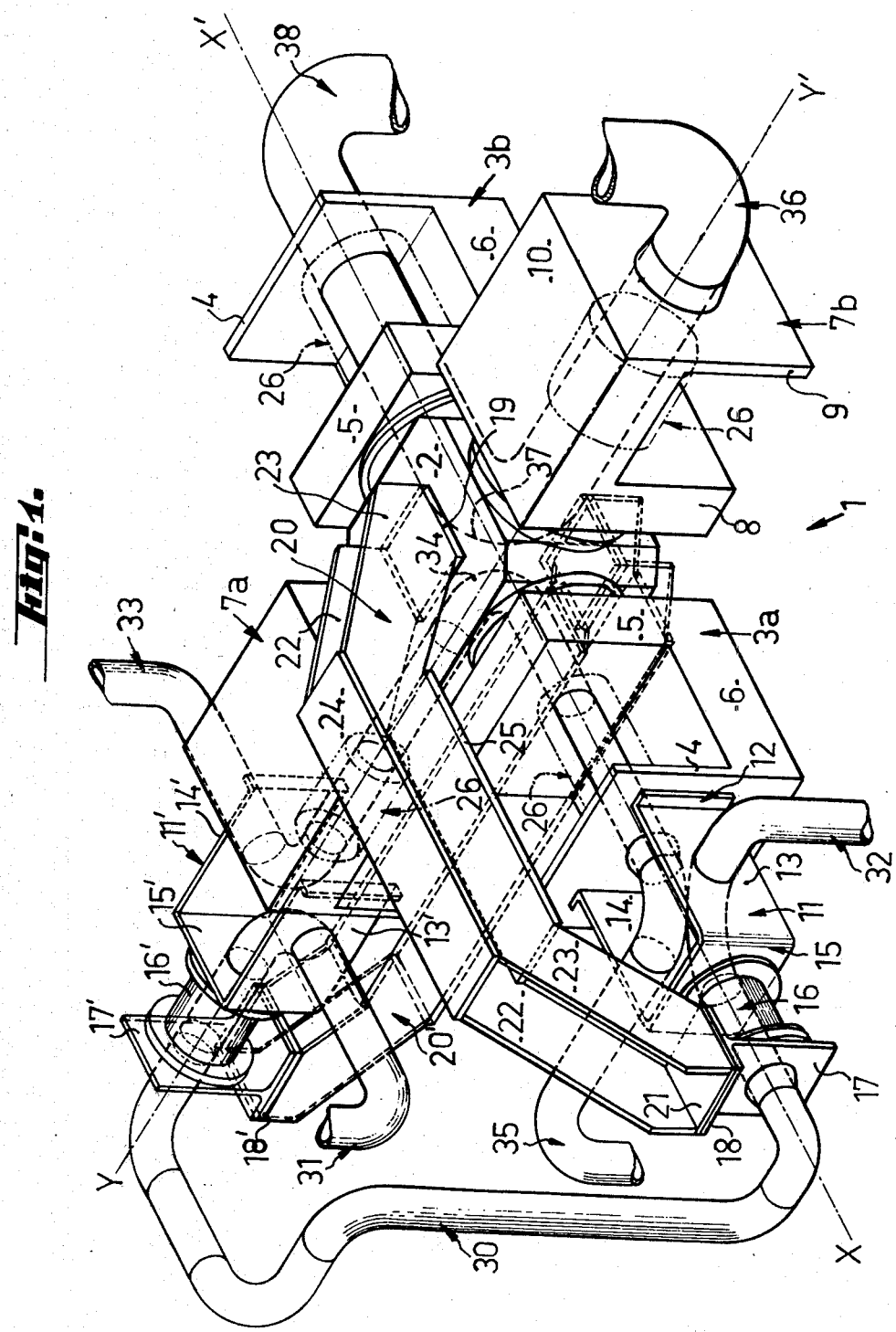
FIG. 1 is a partial perspective view showing a pivotal connection or universal joint coupling according to a first embodiment of the invention.

The pivotal connection or articulating link device 1 illustrated as a perspective view on FIG. 1 is a universal or Cardan or Hooke's joint coupling serving the purpose of connected a compliant column A (FIG. 5) of a sea-bed working structure to a base member B (FIG. 5) resting on the sea-bottom or sea-floor.

The pivotal connection 1 forming a universal Cardan joint coupling comprises a hollow spider 2 of substantially parallelepipedic shape. The centres of two opposite side end faces of the spider 2 define a first axis of rotation XX' whereas the centres of the two other side end faces of the spider define a second axis of rotation YY' extending at right angles to the axis XX'.

Two U-shaped supports 3a, 3b forming each one a bearing clevis-like bracket are mounted in axially aligned registering relationship with the axis XX' on either side of the spider 2, respectively, and are pivotally connected to the latter so as to enable the spider to freely swing about the axis XX'. Both side legs or flanges 4, 5 of each bearing bracket extend at right angles to the axis XX' and are connected to each other at their lower parts by a web member 6 adapted to be secured to the stationary base member positioned underneath the pivotal connection 1.

Two other U-shaped supports 7a, 7b forming each one a bearing bracket are mounted in axially aligned registering relationship with the axis YY' on either side of the spider 2 like the supports 3a, 3b with the only difference that the side legs or flanges 8, 9 of each support 7a, 7b are connected to one another at their upper portions (instead of being interconnected at their lower portions) by a web portion 10. These web portions 10 of the supports 7a and 7b are made fast with or rigidly connected to the immerged bottom part of the column positioned above the pivotal connection or Cardan joint coupling 1.

The bracket 3a associated with the base member is extended along the axis XX' by a yoke 11 secured with its flanged ends 12 of its arms against the side leg 4 of the bracket 3a, with its two arms 13, 14 extending substantially at right angles to the web portion 6 of the support 3a. On the transverse web portion 15 of the yoke 11 is fitted through the agency of a flange the end of an annular torsion joint or coupling 16 axially aligned with the axis XX'. The other end of the torsion joint or coupling 16 is rigidly connected through the medium of the flange to a plate 17 arranged at right angles to the axis XX'. This plate 17 is with its top part secured to or integral with a web member 18 extending at right angles to that plate.

On the top part of the spider 2 is mounted a seating end portion 19 of at least one bridge element 20 extending along the axis XX' and the other seating end portion 21 of which is secured onto the web portion 18 located beyond the yoke 11 and carried by the plate 17. This bridge element 20 consists of a pair of side walls 22, 23 extending in parallel relation to the arms 13, 14 of the yoke 11 and fitted between the seating end portions 19 and 21 of said bridge element. These side walls 22, 23 are connected to the upper part of the bridge element by two upper and lower plates 24 and 25, respectively, extending in substantially parallel relation to the web portion 6 of the bracket 3a.

Likewise, co-extensive with the axis YY' and in extension of the bracket 7a is provided a yoke 11', an annuluar torsion joint or coupling 16', a plate 17' rigidly secured in this case with its bottom part (instead of its top part) to a web portion 18'. Between this web portion 18' and the bottom surface of the spider 2 is mounted a bridge element 20' in the same manner as the bridge element 20.

Within each one of the brackets 3a, 3b, 7a, 7b associated with the spider 2 of the universal joint coupling is mounted a torsion joint or coupling 26 as known per se which extends between the side legs or flanges of each bracket.

With such a universal joint coupling it is possible to provide in the exemplary embodiment shown at least three fluid flow connections between the column and the base member.

A first connecting duct or pipe-line 30 is mounted between the torsion couplings 16, 16' provided along the axis XX', YY', respectively, and rigidly connected to one end of the yokes 11 and 11', respectively. A duct 31 made fast with the column is connected to that end of the torsion coupling 16' which is made fast with the yoke 11' while extending for instance through the arm 13' of said yoke. A duct 32 made fast with the base member is connected to that end of the torsion coupling 16 which is made fast with the yoke 15 while extending for instance through the arm 13 of the yoke 11. Thus is defined a first fluid flow conveying connection between the column and the base member through the agency of the duct 31, the torsion coupling 16', the connecting duct 30, the torsion coupling 16 and the duct 32.

A duct or pipe-line 33 bound to the column is connected to its lower end to one end of the torsion coupling or joint 26 of the bracket 7a while extending for instance through the arm 14' of the yoke 11'. Towards its other end, the torsion coupling 26 is secured to a bent connecting duct 34 accommodated or housed inside the spider 2 and connecting this torsion coupling 26 to one end thereof positioned within the bracket 3a. The other end of the torsion coupling 26 of the bracket 3a is secured to a duct 35 made fast with the base member while extending for instance through the arm 14 of the yoke 11. Thus has been defined a second fluid flow connection between the column and the base member, consisting of the duct 33, the torsion coupling 26 of the bracket 7a, the connecting duct 34 of the spider, the torsion coupling 26 of the bracket 3a and the duct 35 made fast with the base member.

A third duct or pipe-line 36 made fast with the column is communicating through its lower part with the torsion coupling 26 of the bracket 7b. The other end of the torsion coupling 26 is connected by means of a bent connecting duct 37 accommodated or housed within the spider 2 to one end of the torsion coupling 26 positioned within the bracket 3b. The other end of this torsion coupling 26 is connected to a duct 38 made fast with the base member.

Thus has been defined a third fluid flow carrying connection between the column and the base member, consisting of the duct 36, the torsion coupling 26 of the bracket 7b, the connecting duct 37, the torsion coupling 26 of the bracket 3b, and the duct 38 leading from the base member. Other fluid flow connections of that type may of course be provided by the universal Cardan joint coupling.

It should be pointed out that all of the aforesaid ducts or pipe-lines are rigid and that the relative motions of the column with respect to the base member are taken up or absorbed at the whole system of torsion couplings.

When the column rigidly connected to the brackets 7a, 7b is oscillating or swinging about the axis YY', the bracket 7a together with its yoke 11' and the bracket 7b alone are following up the motions of the column whereas the spider 2 of the universal Cardan joint coupling remains stationary. During the swinging motions of the column, the torsion coupling 16' associated with the yoke 11' would deform itself but enables the connecting duct 30 made fast with this torsion coupling as well as the bridge element 20' to be made independent of such oscillations. By deforming itself the torsion coupling 26 positioned within the bracket 7a enables the fluid flow connection to be kept up between the duct 33 following up the motions of the column and the stationary connecting duct 34 positioned inside the spider 2 of the universal Cardan joint coupling. Likewise, by deforming itself the torsion coupling 26 positioned within the bracket 7b enables the fluid flow connection to be kept up between the duct 36 following up the motions of the column and the stationary connecting duct 37 positioned within the spider 2 of the universal Cardan joint coupling.

When the column is swinging about the axis XX' carried by the base member, the spider 2, the brackets 7a, 7b, the yoke 11', the bridge element 20' arranged in co-extensive relationship with the axis YY', are following up the motions of the column. The spider 2 being made movable would also carry along the bridge element 20 but owing to its manner of connection to the brackets 3a, 3b mounted along the axis XX', the latter are remaining stationary as well as the yoke 11 rigidly secured to the bracket 3a. With the yoke 11 remaining stationary, the bridge element 20 may swing in view of the provision of the torsion coupling 16. This torsion coupling also enables the fluid flow connection to be kept up between the connecting duct 30 following up the motions of the column and the stationary duct 32 made fast with the base member. The torsion coupling 26 of the bracket 3a enables the fluid flow connection to be kept up between the duct 33 following up the motions of the column and the stationary duct 35 secured to the base-member. The torsion coupling 26 of the bracket 3b enables the fluid flow connection to be kept up between the duct 36 following up the motions of the column and the stationary duct 38 secured to the base-member.

Figure 2:
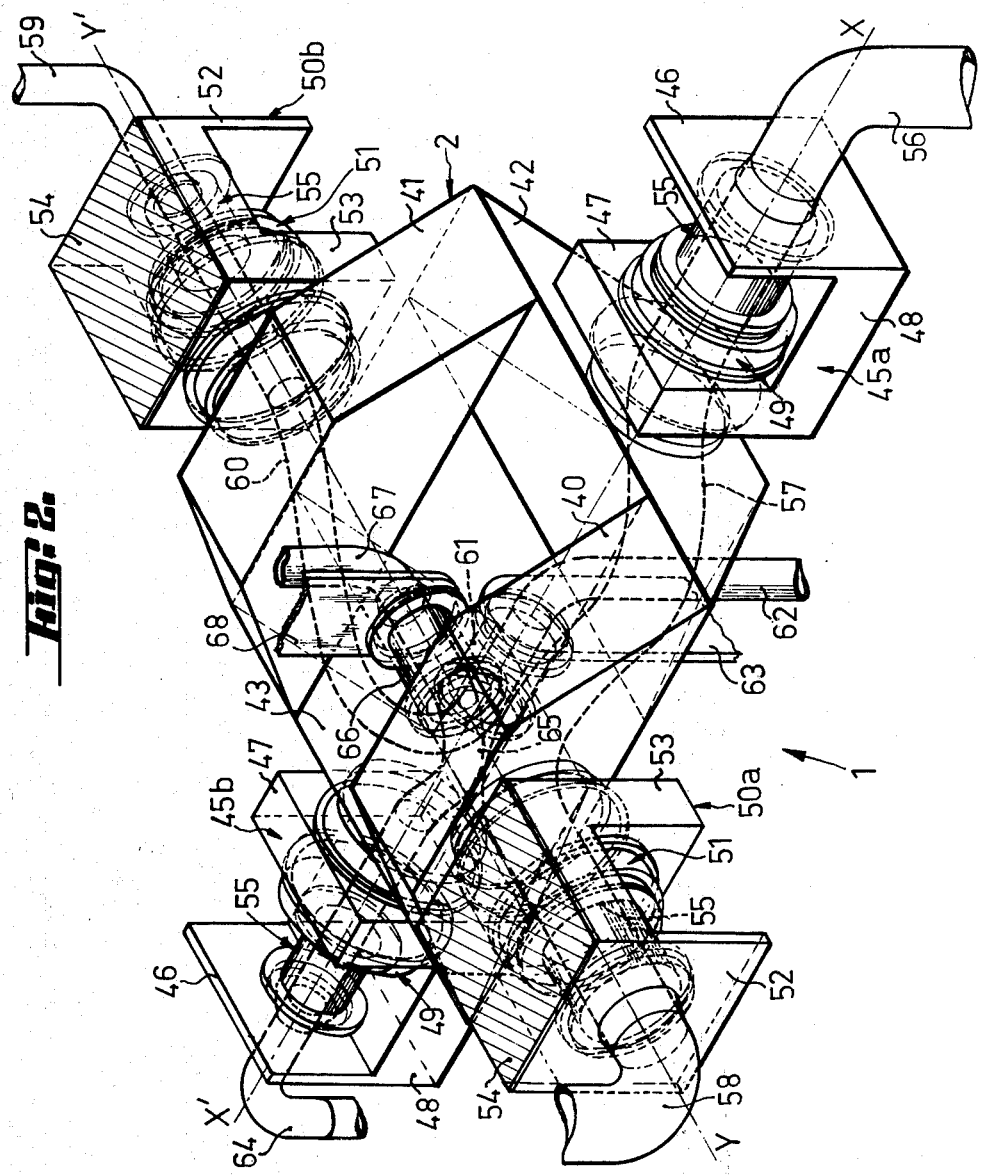
FIG. 2 is a fragmentary perspective view of a pivotal connection or universal joint coupling according to a second embodiment of the invention.
Figure 3:
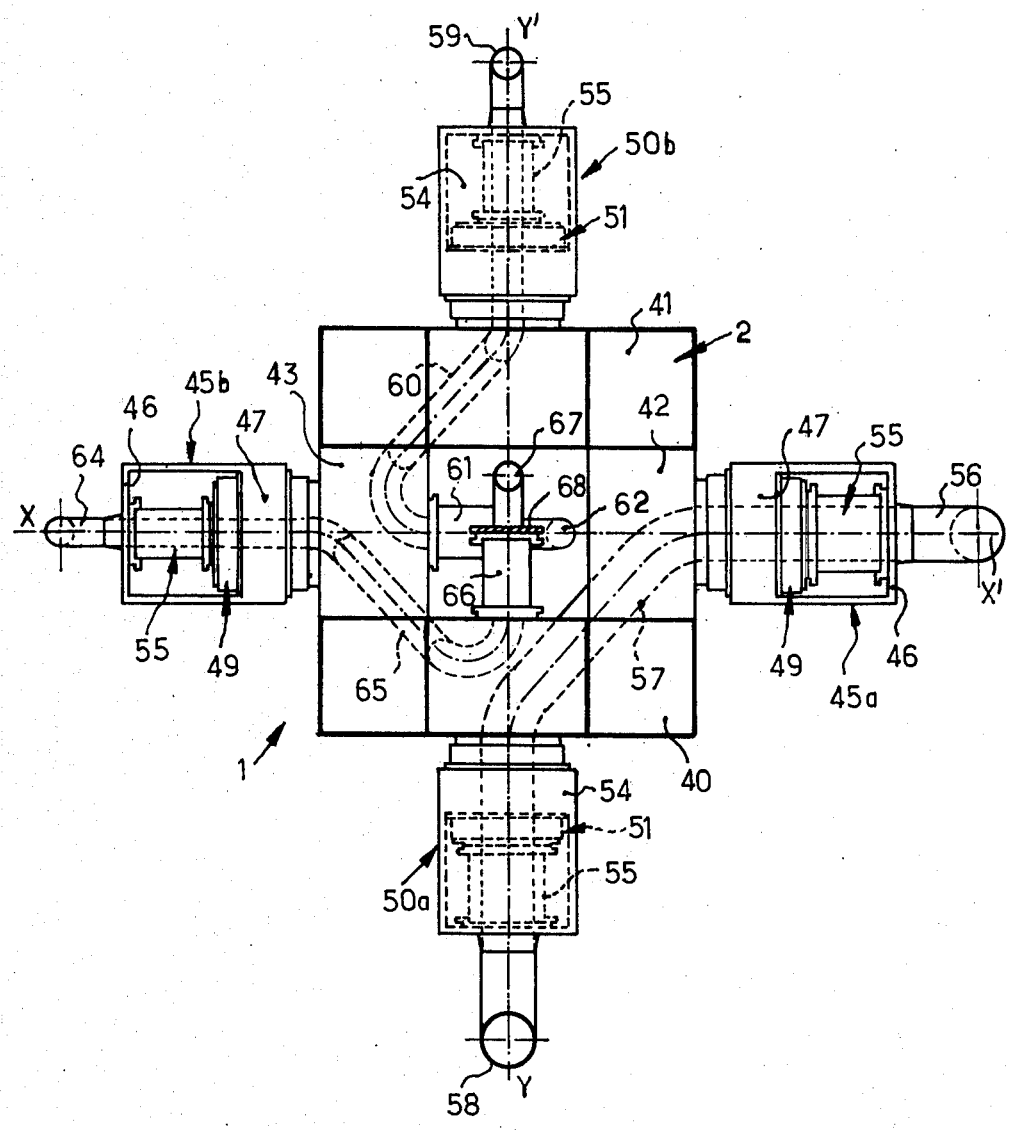
FIG. 3 is a top or plan view of the arrangement shown in FIG. 2.

In FIGS. 2 and 3 is shown a second embodiment of the universal Cardan joint coupling according to the invention. The spider 2 of the universal Cardan joint coupling 1 consists of an assembly of four trapezoidal blocks 40, 41, 42, 43. More specifically, both blocks 40, 41 are mounted in parallel relation to each other and connected together by the two blocks 42 and 43 mounted in parallel relation to each other and upside down or in a reversed inverted position with respect to the blocks 40 and 41. Both axes of rotation XX', YY' of the universal Cardan joint coupling 1 are extending through the centres of the trapezoidal blocks 42, 43 and 40, 41, respectively. These axes of rotation extending at right angles to each other are in this case axially off-set or shifted with respect to one another. With each one of the trapezoidal blocks 40, 41, 42, 43 is associated a bracket in the same manner as in the previous embodiment.

More specifically on either side of the lower trapezoidal blocks 42 and 43 are mounted two brackets 45a, 45b, respectively, registering along the axis of rotation XX'. The side legs or flanges 46, 47 of each brackets 45a, 45b extend at right angles to the axis XX' and are connected together at their bottom portions by a web portion 48. The web portions 48 of both brackets 45a and 45b are secured to the base member located below the universal Cardan joint coupling 1. Each bracket 45a, 45b is pivotally connected to the spider 2 so as to enable the latter to swing about the axis XX' in the same manner as in the foregoing embodiment. For this purpose the lower trapezoidal blocks 42 and 43 are provided with a flange extending into a sleeve 49 which fully extends through the side leg 47 of the brackets 45a and 45b. The brackets 50a, 50b associated with the axis of rotation YY' are likewise mounted on the blocks 40, 41 of the spider 2 through the agency of a sleeve 51 but with the difference that the side legs 52 and 53 of each bracket are connected together at their top parts by a web portion 54. The web portions 54 are made fast with the immerged bottom portion of the column extending above the universal Cardan joint coupling 1.

Within each one of the brackets 45a, 45b, 50a, 50b is mounted an annular torsion coupling 55 which is rigidly connected with one end thereof to that side leg of the bracket which is opposite or remote from the spider and with its other end in clamped or tight contacting relationship with the associated connecting sleeve through the medium of a flange.

The torsion coupling 55 of the bracket 55a arranged along the axis XX' is connected with one end thereof to a rigid duct or pipe-line 56 bound to the base member and extending through the side leg 46 of the bracket 45a. The other end of the torsion coupling 55 is connected through a rigid connecting duct 57 extending through the blocks 42 and 40 of the spider to the torsion coupling 55 of the bracket 50a arranged along the axis of rotation YY'. The other end of the torsion coupling 55 of the bracket 50a is connected to a rigid duct or pipe-line 58 bound to the column and extending with its lower end through the side leg 52 of the bracket 50a. Thus is defined a rigid fluid flow conveying connection between the column and the base member, consisting of the duct 58, the torsion coupling 55 of the bracket 50a, the rigid connecting duct 57, the torsion coupling 55 of the bracket 45a and the rigid duct 56 tied to the base member.

The torsion coupling 55 of the bracket 50b arranged along the axis of rotation YY' is connected with one end thereof to a rigid duct or pipe-line 59 rigidly carried by the column and extending at its lower part through the side leg 52 of the bracket 50b. The other end of the torsion coupling 55 of the bracket 50b is connected to a rigid connecting duct 60 which extends through the upper block 41 and the lower block 43 of the spider to open into a torsion coupling 61 axially aligned in registering relationship with the axis of rotation YY' and located within the free inner space of the spider 2. The other end of this torsion coupling 61 is connected to a rigid duct or pipe-line 62 bound to the base member. A supporting arm 63 rigidly connected to the base member enables the torsion coupling 61 to be held and kept in position. Thus is defined a second fluid flow conveying connection between the column and the base member, consisting of the rigid duct 59 made fast with the column, the torsion coupling 55 of the bracket 50b, the rigid connecting duct 60, the torsion coupling 61 and the rigid duct 62 bound to the base member.

The end of the torsion coupling 55 carried by the side leg 46 of the bracket 45b is connected to a rigid duct or pipe-line 64 carried by the base member and extending at its lower part through the side leg 46 of the bracket 45b. The other end of the torsion coupling 55 of the bracket 45b is connected through a rigid connecting duct 65 to an annular torsion coupling 66 axially aligned in registering relationship with the axis of rotation YY' of the universal Cardan joint coupling and mounted within the free inner space of the spider 2. The other end of this torsion coupling 66 is connected to a rigid duct or pipe-line 67 bound to the column. This torsion coupling is held and kept in position through the agency of a supporting arm or lug 68 rigidly connected to the column.

Thus has been defined a third fluid flow carrying connection between the column and the base member, consisting of the rigid duct 67 bound to the column, the torsion coupling 66, the rigid connecting duct 65, the torsion coupling 55 of the bracket 45b and the rigid duct 64 bound to the base member.

In this embodiment all the fluid flow conveying connections extend through the spider 2 of the universal Cardan joint coupling and it is possible by increasing the size of the spider to have more than three ducts extend through the spider of the universal Cardan joint coupling.

Figure 4:
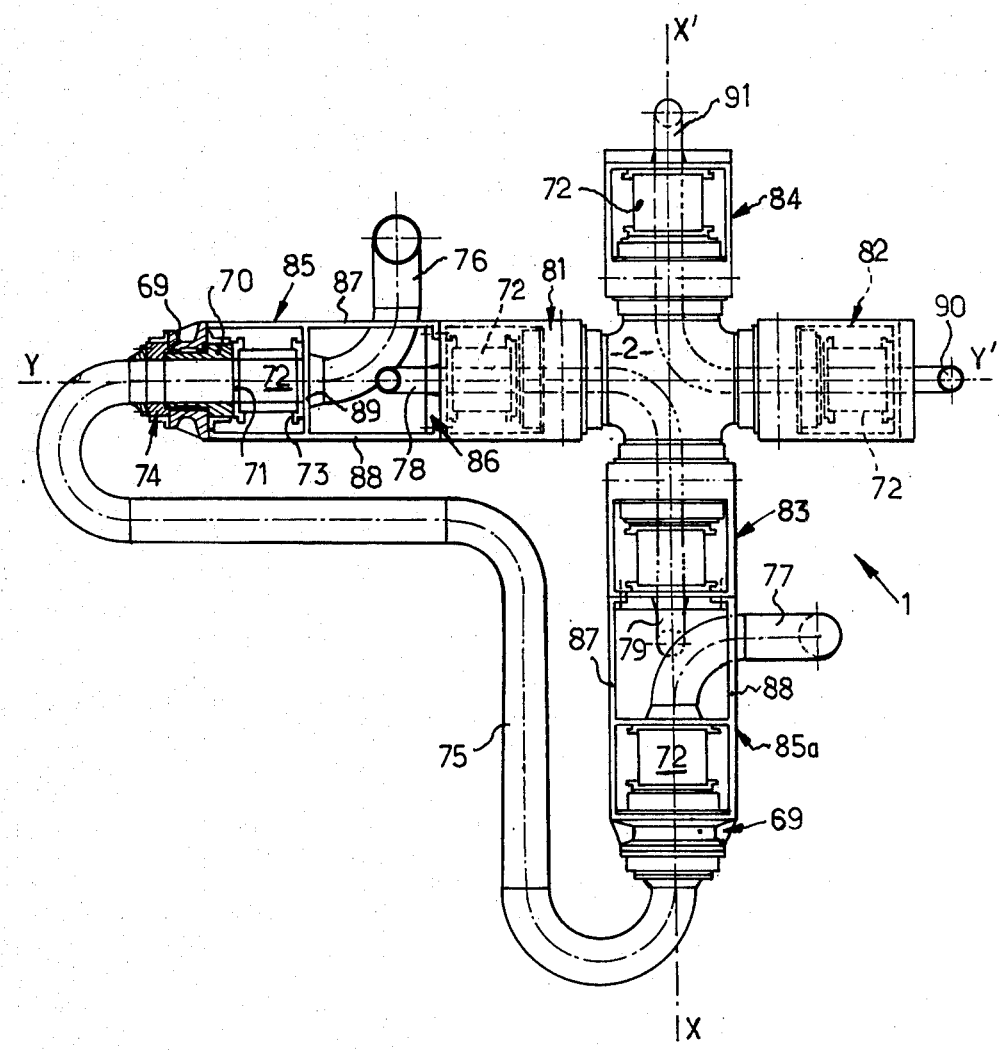
FIG. 4 is a top or plan view showing a pivotal connection or universal joint coupling according to a third embodiment of the invention.

In FIG. 4 is shown a third embodiment of the universal Cardan joint coupling according to the invention and which in this case enables at least one fluid flow conveying connection to extend between the column and the base member outside the spider of the universal Cardan joint coupling.

The universal Cardan joint coupling 1 comprises a spider 2 of substantially parallelepipedic shape pivotally mounted for swinging motion about two axes of rotation XX' and YY', respectively, extending at right angles to each other, by means of four brackets, 81, 82, 83, 84 as in the previous embodiments, the brackets 81 and 82 being rigidly secured to the column whereas the brackets 83 and 84 are rigidly secured to the base member.

The bracket 81 axially aligned in registering relationship with the axis of rotation YY' of the universal Cardan joint coupling is extended by a yoke 85 the flanged end edges 86 of which are rigidly connected to the bracket 81 whereas its arms 87 and 88 extend substantially at right angles to the plane of the base-member located underneath the universal Cardan joint coupling 1. The inside space of this yoke 85 is divided into two compartments by a cross-member 89.

At the web portion of the yoke is mounted an annular body 69 forming a bearing and in which is mounted a sleeve or bushing 70 made fast inside of the yoke 85 with a flange 71 which carries one end of a torsion coupling 72 the other end of which is rigidly connected through the medium of a flange 73 to the cross member 89. The other end of the sleeve or bushing 70 is rigidly secured to a ring or collar 74.

The bracket 83 of the universal Cardan joint coupling 1, mounted along the axis of rotation XX', is extended by a yoke 85a in the same manner as the yoke 85 made fast with the bracket 61 axially aligned with the axis of rotation YY'.

Both rings or collars 74 of the yokes 85 and 85a are connected together by a rigid connecting duct 75. The torsion coupling 72 mounted within the yoke 85 is connected at the cross-member 89 to a rigid duct or pipe-line 76 carried by the column and extending for instance through the arm 87 of the yoke. The torsion coupling 72 rigidly secured to the yoke 85a is connected through the medium of the cross-member 89 to a rigid duct or pipe-line 77 carried by the base member and extending for instance through the arm 88 of the yoke 85a.

Thus has been defined a fluid flow conveying connection between the column and the base member, consisting of the duct 76 bound to the column, the torsion coupling 72, the sleeve or bushing 70 of the yoke 85, the rigid connecting duct 75, the sleeve or bushing 70 of the yoke 85a, the torsion coupling 72 and the rigid connecting duct 77 tied to the base member. This fluid flow connection fully extends outside of the spider 2 of the universal Cardan joint coupling. Such a fluid flow connection may of course be duplicated on the one hand by associating a yoke 85 with the brackets 82 and 84 and on the other hand by increasing the longitudinal dimension of the yokes 85 and 85a with a view of mounting a plurality or rigid connecting ducts such as the duct 75.

As previously however it is possible to provide two additional fluid flow conveying connections between the column and the base member extending through the spider 2 of the universal Cardan joint coupling in the same manner as that described with reference to the first embodiment, i.e. between a duct or a pipe-line 78 rigidly connected to the column and associated with the bracket 81 and a ductor or a pipe-line 79 associated with the bracket 83 and rigidly connected to the base member as well as between a duct or a pipe-line 90 bound to the column and associated with the bracket 82 and a duct or pipe-line 91 bound to the base member and associated with the bracket 64.

When the column rigidly connected to the brackets 81 and 82 starts to swing about the axis of rotation YY', the spider 2, the brackets 83, 84 and the yoke 85a remain stationary. However, the yoke 85 following up the motions of the bracket 81 would rotate through the medium of its bearing 69 about the sleeve 70, so that the rigid connecting duct 75 is made independent of the swinging motions of the column. In such a case the torsion coupling 72 associated with the yoke 85 would compensate for the motions of the duct or pipe-line 76 bound to the swinging motions of the column.

When the column is swinging about the axis XX' carried by the base member, the bracket 84, the bracket 83 and the yoke 85a made fast with the bracket 83 would remain stationary whereas the brackets 81, 82 and the yoke 85 would follow up the motions of the column. The rigid connecting duct 75 is therefore moved along but the sleeve 70 rigidly connected to the end of the connecting duct 75 associated with the yoke 85a is rotatable through the medium of the stationary bearing 69 bound to the yoke 85a. Therefore the connecting duct 75 will not be damaged.

This third embodiment differs from the first embodiment in that the bridge elements are omitted or dispensed with and are substituted for by yokes forming bearings mounted in registering relationship with the axes of rotation or the universal Cardan joint coupling.

It should be pointed out that all of the rigid connecting ducts between the column and the base member have a continuous or uniform cylindrical cross-section and exhibit rather wide bends so as to enable a pig tool or like scraper or scratcher implement or go-devil device to be run or moved therethrough. This is advantageous when the ducts and the pipe-lines are conveying petroleum oil. The latter loaded with paraffin would tend to clog or foul the ducts and pipe-lines and it is preferable to have the possibility of cleaning the inside of the ducts by means of such a pig tool or like go-devil implement.

The universal Cardan joint couplings such as described with reference to the three foregoing embodiments are advantageously used with sea-bed working structures and may each one carry a different fluid according to the operations to be performed.

It should be understood that the invention is not at all limited to the embodiments which have been described and given by way of illustrative examples but it comprises all the technical equivalents of the means described as well as their combinations if the latter are carried out and used according to the gist and within the scope of the appended claims.

What is claimed is:

1. A pivotal connecting device of the kind forming a universal Cardan joint coupling in particular for a compliant or articulated column of a sea-bed working structure, said column being pivotally connected to a base member resting on the sea-bottom so as to be capable of swinging about two axes of rotation extending at right angles to each other and supported by said column and said base member, respectively, rigid connecting ducts being provided between the base member and the column, which ducts are associated with four torsion couplings axially aligned by pairs along the axis of rotation, for the flow of fluids between the column and the base member, each of the couplings associated with the base member being connected with the corresponding coupling associated with the column through a rigid duct, these connecting ducts extending through the inside of a Cardan joint spider which has generally a parallelepipedic hollow shape, wherein at least one rigid connecting duct is provided outside of the spider of the Cardan joint coupling, said duct extending between associated additional torsion couplings aligned along the axis of rotation and connected to the base member and the column, respectively.

2. A pivotal connecting device of the kind forming a universal Cardan joint coupling in particular for a compliant or articulated column of a sea-bed working structure, said column being pivotally connected to a base member resting on the sea-bottom so as to be capable of swinging about two axes of rotation extending at right angles to each other and supported by said column and said base member, respectively, said Cardan joint coupling being associated with at least one rigid connecting duct for conveying the flow of at least one fluid between said base member and said column, said Cardan joint coupling comprising a hollow spider of substantially parallelepipedic shape pivotally connected to a pair of brackets mounted on either side of two opposite side end faces of said spider in registering relation to a first axis of rotation, said brackets being rigidly connected to said base member, and to a second pair of brackets mounted on either side of the two other opposite side end faces of said spider in registering relation to a second axis of rotation extending at right angles to said first axis of rotation, these latter brackets being rigidly connected to the immerged bottom end of said column, wherein at least one of the brackets associated with said first axis of rotation and at least one of the brackets associated with said second axis of rotation are axially extended by a yoke, the web portion of each yoke forming a bearing for a sleeve rigidly secured at one end to a torsion coupling axially aligned with the associated axis of rotation and supported at its other end by the associated yoke, the free ends of the two sleeves being connected together by means of a rigid connecting duct extending outside of the spider of said Cardan joint coupling.

3. A device according to claim 2, wherein several aforesaid rigid connecting ducts are mounted between said column and said base member and all extend outside of the spider of said Cardan joint coupling.

4. A device according to claim 2, wherein several aforesaid rigid connecting ducts are mounted between the column and the base member, some of which extend outside of the spider of said Cardan joint coupling and others extend inside of said spider.

5. A device according to claim 4, wherein each aforesaid duct has a continuous or uniform cylindrical cross-section to enabled a pigging tool for instance to be run therethrough.

* * * * *